(12) United States Patent
Aoki

(10) Patent No.: US 10,442,376 B2
(45) Date of Patent: Oct. 15, 2019

(54) VEHICLE POWER SUPPLY CONTROL DEVICE

(71) Applicant: Yazaki Corporation, Tokyo (JP)

(72) Inventor: Yoshihito Aoki, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 139 days.

(21) Appl. No.: 15/888,597

(22) Filed: Feb. 5, 2018

(65) Prior Publication Data
US 2018/0222411 A1    Aug. 9, 2018

(30) Foreign Application Priority Data

Feb. 9, 2017   (JP) ................ 2017-022579

(51) Int. Cl.
| | |
|---|---|
| *B60R 16/033* | (2006.01) |
| *B60L 1/00* | (2006.01) |
| *B60L 1/10* | (2006.01) |
| *B60L 3/12* | (2006.01) |
| *B60L 58/12* | (2019.01) |

(52) U.S. Cl.
CPC .............. *B60R 16/033* (2013.01); *B60L 1/00* (2013.01); *B60L 1/10* (2013.01); *B60L 3/12* (2013.01); *B60L 58/12* (2019.02); *Y02T 10/7005* (2013.01)

(58) Field of Classification Search
None
See application file for complete search history.

(56) References Cited

U.S. PATENT DOCUMENTS

2014/0159482 A1    6/2014 Satake et al.

FOREIGN PATENT DOCUMENTS

JP        2013-042563 A    2/2013

*Primary Examiner* — Jared Fureman
*Assistant Examiner* — Aqeel H Bukhari
(74) *Attorney, Agent, or Firm* — Sughrue Mion, PLLC

(57) ABSTRACT

A vehicle power supply control device includes trunk line units of two systems provided in a vehicle; branch line units branched from the trunk line units of two systems; a vehicle power supply master coupled to one side of the trunk line units of two systems and includes a main battery that charges and discharges electric power; and a plurality of area power supply masters coupled to the trunk line units of two systems via the branch line units, coupled to a load that consumes electric power, and each include an area battery that charges and discharges electric power. The vehicle power supply master supplies electric power of the main battery to the area power supply masters via the trunk line units of two systems, and the area power supply masters supply, to the load, electric power supplied from the vehicle power supply master or charged in the area battery.

20 Claims, 9 Drawing Sheets

VEHICLE POWER SUPPLY CONTROL DEVICE

CROSS-REFERENCE TO RELATED APPLICATION(S)

The present application claims priority to and incorporates by reference the entire contents of Japanese Patent Application No. 2017-022579 filed in Japan on Feb. 9, 2017.

BACKGROUND OF THE INVENTION

1. Field of the Invention

The present invention relates to a vehicle power supply control device.

2. Description of the Related Art

Conventionally, a vehicle power supply control device supplies electric power to a load installed in a vehicle. For example, the vehicle power supply control device includes a battery, and a power supply box that is coupled to the battery and is coupled to a plurality of loads (for example, Japanese Patent Application Laid-open No. 2013-042563). The vehicle power supply control device supplies the electric power supplied from the battery via the power supply box to the respective loads.

Incidentally, in vehicles, there are cases in which a trunk line unit extending along the traveling direction of the vehicle and having a certain current capacity is provided. In this case, the vehicle power supply control device may supply the electric power of the battery to the respective loads via power supply boxes that are coupled to branch line units branching off from the trunk line unit, and in terms of this point, there is room for further improvement.

SUMMARY OF THE INVENTION

The present invention has been made in view of the above-mentioned circumstances, and an object of the invention is to provide a vehicle power supply control device capable of stably supplying the electric power to a plurality of loads on a vehicle.

In order to solve the above mentioned problem and achieve the object, a vehicle power supply control device according to one aspect of the present invention includes trunk line units of multiple systems provided in a vehicle; branch line units branched from the trunk line units of multiple systems; a master power supply controller that is coupled to the trunk line units of multiple systems and includes a main electrical storage device that charges and discharges electric power; and a plurality of area power supply controllers that are coupled to at least one of the trunk line units of multiple systems via the branch line units, are coupled to a load that consumes electric power, and each of the plurality of area power supply controllers includes a sub-electrical storage device that charges and discharges electric power, wherein the master power supply controller supplies electric power of the main electrical storage device to the area power supply controllers via at least one of the trunk line units of multiple systems and the branch line units, and the area power supply controllers supply, to the load, electric power that is supplied from the master power supply controller or electric power that is charged in the sub-electrical storage device.

According to another aspect of the present invention, in the vehicle power supply control device, it is preferable that the load includes a plurality of loads, the loads constitute a plurality of different load groups, and each of the load groups is coupled to the trunk line unit of a different system out of the trunk line units of multiple systems via at least one of the area power supply controllers.

According to still another aspect of the present invention, in the vehicle power supply control device, it is preferable that each of the area power supply controllers supplies electric power of the sub-electrical storage device to the load, when the master power supply controller is unable to supply electric power to the relevant area power supply controller via at least one of the trunk line units of multiple systems and the branch line units.

According to still another aspect of the present invention, in the vehicle power supply control device, it is preferable that each of the area power supply controllers supplies electric power of the sub-electrical storage device to the load, when a charging rate of the sub-electrical storage device is equal to or greater than a predetermined set value, and supplies no electric power of the sub-electrical storage device to the load, when the charging rate of the sub-electrical storage device is below the set value.

According to still another aspect of the present invention, in the vehicle power supply control device, it is preferable that each of the area power supply controllers preferentially supplies electric power of the sub-electrical storage device to the load, when the master power supply controller is able to supply electric power to the relevant area power supply controller via at least one of the trunk line units of multiple systems and the branch line units, and when a charging rate of the sub-electrical storage device is equal to or greater than the set value.

According to still another aspect of the present invention, in the vehicle power supply control device, it is preferable that the master power supply controller supplies, depending on a situation, electric power of the sub-electrical storage device of one of the area power supply controllers to the load that is coupled to another area power supply controller via at least one of the trunk line units of multiple systems and the branch line units.

According to still another aspect of the present invention, in the vehicle power supply control device, it is preferable to further include an external power supply unit that is provided outside the area power supply controllers and is capable of supplying electric power to the area power supply controllers; a first supply path that supplies electric power to the area power supply controllers from the master power supply controller via one of the trunk line units of multiple systems and the branch line units; and a second supply path that is different from the first supply path and supplies electric power to the area power supply controllers from the external power supply unit, wherein each of the area power supply controllers supplies, to the load, electric power supplied from the master power supply controller via the first supply path or electric power supplied from the external power supply unit via the second supply path.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

With reference to the accompanying drawings, forms to implement the present invention (exemplary embodiments) will be described in detail. The present invention is not intended to be limited by the content of the embodiments described below. Furthermore, the constituent elements described in the following include those that a person skilled in the art can easily assume or that are substantially the same. The configurations described in the following can be combined as appropriate. Moreover, various omissions, substitutions, or modifications of the configurations can be made without departing from the scope of the invention.

First Embodiment

Figure 1:
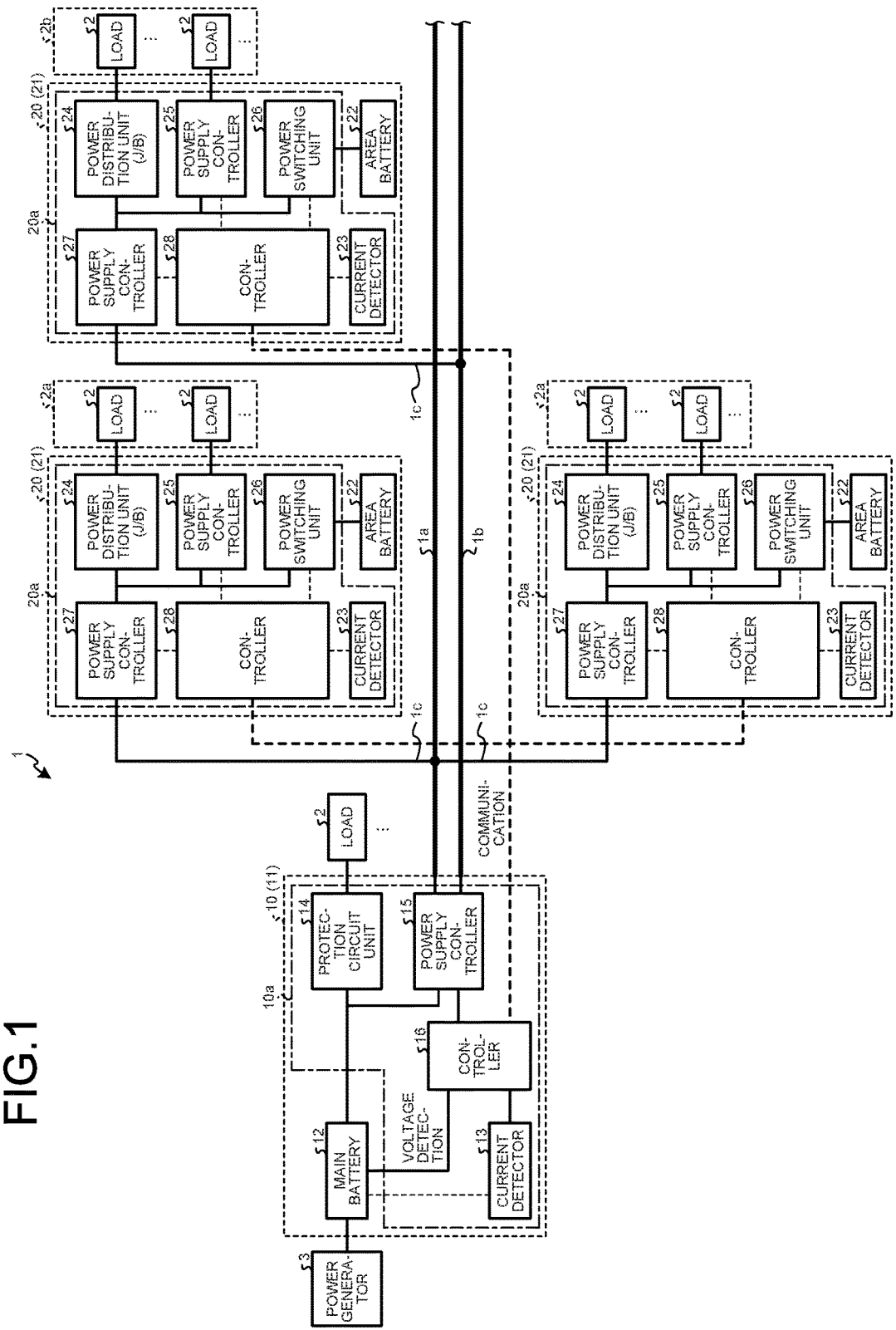
FIG. 1 is a block diagram illustrating a configuration example of a vehicle power supply control device according to a first embodiment.
Figure 2:
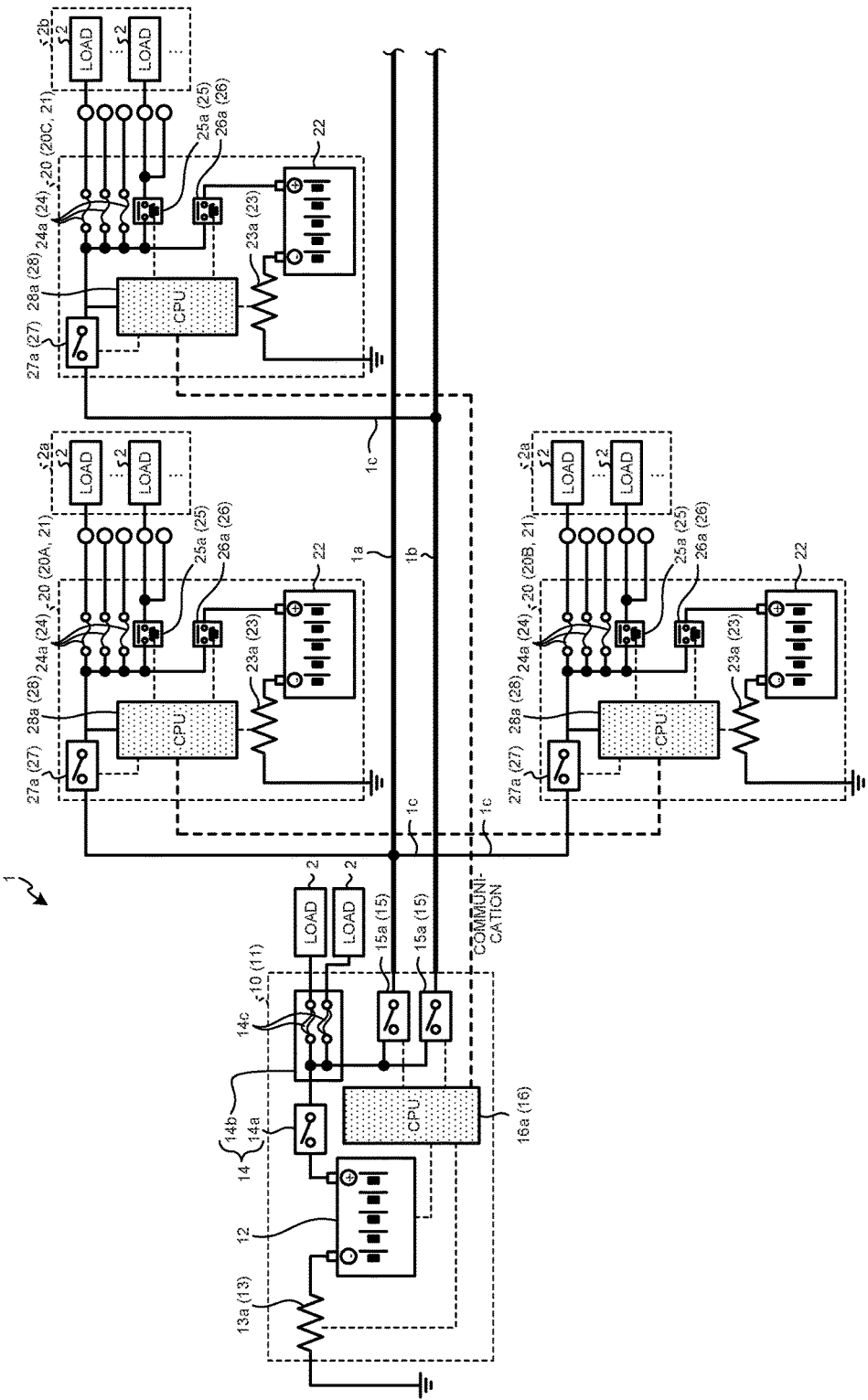
FIG. 2 is a schematic circuit diagram illustrating the configuration example of the vehicle power supply control device in the first embodiment.

A vehicle power supply control device 1 according to a first embodiment will be described. The vehicle power supply control device 1 is, as illustrated in FIGS. 1 and 2, installed in a vehicle not depicted and supplies electric power to a plurality of loads 2 installed in the vehicle. The following describes the vehicle power supply control device 1 in detail.

The vehicle power supply control device 1 includes trunk line units 1a and 1b of multiple systems (for example, two systems), a plurality of branch line units 1c, a vehicle power supply master 10, and a plurality of area power supply masters 20. In the vehicle power supply control device 1, the trunk line units 1a and 1b of two systems extend along the traveling direction of the vehicle, and the respective branch line units 1c branch off from the trunk line unit 1a or 1b of two systems. The trunk line units 1a and 1b of multiple systems may be formed in a T-shape by making them extend along the direction extending in the traveling direction of the vehicle and extend along the direction orthogonal to the traveling direction of the vehicle. The trunk line units 1a and 1b of two systems are what are called back-bone trunk line units, and the vehicle power supply master 10 is coupled to one side thereof. The trunk line units 1a and 1b of two systems are coupled to the respective area power supply masters 20 via the respective branch line units 1c.

The trunk line units 1a and 1b of two systems include trunk-line unit power supply lines, trunk-line unit communication lines, and others that are not depicted. The trunk line units 1a and 1b of two systems only need to include the trunk-line unit power supply lines out of the trunk-line unit power supply lines, trunk-line unit communication lines, and others, and the trunk-line unit communication lines and others are not indispensable constituents. In the trunk line units 1a and 1b of two systems, the trunk-line unit power supply lines, trunk-line unit communication lines, and others are arranged so as to run parallel along the traveling direction of the vehicle. The trunk-line unit power supply line has a certain current capacity, and is made up of wiring material having a round rod conductor or a stranded conductor, or a belt-like flat conductor for which the cross-sectional shape is flat, or the like. The trunk-line unit power supply line flows the current that is supplied from the vehicle power supply master 10 and the respective area power supply masters 20. The trunk-line unit communication line has a certain communication capacity, and is made up of an electric signal transmission cable, an optical signal transmission cable, or the like. The trunk-line unit communication line transmits signals sent from the vehicle power supply master 10 and the respective area power supply masters 20.

The trunk line units 1a and 1b of two systems are used by sorting the loads 2 by type, for example. Each of the loads 2 is sorted into different load groups 2a and 2b by the type of each load 2, for example. Each load 2 is sorted into, for example, a first load group 2a that concerns the traveling of the vehicle and the importance of which is relatively high and a second load group 2b that concerns the matters other than the traveling of the vehicle and the importance of which is relatively low. Out of the trunk line units 1a and 1b of two systems, the first trunk line unit 1a is coupled to the first load group 2a that concerns the traveling of the vehicle via the area power supply masters 20, for example. The second trunk line unit 1b is coupled to the second load group 2b that concerns the matters other than the travelling of the vehicle via the area power supply masters 20. The trunk line units 1a and 1b of multiple systems may be the systems of two or more. The trunk line units 1a and 1b of multiple systems may be other than the method of sorting the respective loads 2 by the types, and may be sorted by the area of the vehicle, for example. The trunk line units 1a and 1b of multiple systems may be arranged in separate routes in order to protect the trunk line units 1a and 1b of the systems or ensure the wiring space.

Each of the branch line units 1c includes a branch-line unit power supply line, a branch-line unit communication line, and others that are not depicted. Each of the branch line units 1c only needs to include the branch-line unit power supply line, out of the branch-line unit power supply line, branch-line unit communication line, and others, and the branch-line unit communication line and others are not indispensable constituents. In each of the branch line units 1c, one end is coupled to the trunk line unit 1a or 1b of two systems and the other end is coupled to the respective area power supply masters 20. The branch-line unit power supply line has a current capacity less than that of the trunk-line unit power supply line, and is made up of wiring material having a round rod conductor or a stranded conductor, or a belt-like flat conductor for which the cross-sectional shape is flat, or the like. The branch-line unit power supply line flows the current that is supplied from the respective area power supply masters 20. The branch-line unit communication line has a communication capacity less than that of the trunk-line unit communication line, and is made up of an electric signal transmission cable, an optical signal transmission cable, or the like. The branch-line unit communication line transmits signals sent from the respective area power supply masters 20.

The vehicle power supply master 10 is a master power supply controller, and supplies the electric power of a main battery 12, which will be described later, to the loads 2. For example, the vehicle power supply master 10 supplies the electric power of the main battery 12 to each load 2 via the respective area power supply masters 20, or supplies the electric power of the main battery 12 to each load 2 without using the respective area power supply masters 20. The vehicle power supply master 10 includes an electric power controller 10a, a housing 11, and the main battery 12. The electric power controller 10a has control of the electric power of the main battery 12, and includes a current detector 13, a protection circuit unit 14, a power supply controller 15, and a controller 16. In the vehicle power supply master 10, the electric power controller 10a and the main battery 12 are accommodated in the housing 11, for example. As just described, the vehicle power supply master 10 is installed in an engine compartment of the vehicle in a state in which various electronic components of the electric power controller 10a are accommodated in the housing 11, for example. Accordingly, in the vehicle power supply control device 1, the vehicle power supply master 10 can be easily installed. In the vehicle power supply master 10, the main battery 12 may be installed outside the housing 11.

The main battery 12 is a main electrical storage device, and charges and discharges the electric power. Examples of the main battery 12 include various storage batteries such as lead batteries, nickel-hydrogen batteries, and lithium-ion batteries. The main battery 12 is a battery with a capacity larger than that of an area battery 22, which will be described later. The main battery 12 may have a capacity equivalent to that of the area battery 22, or may have a capacity smaller than that of the area battery 22. The main battery 12 is coupled to a power generator 3 such as an alternator, for example, and is charged by the electric power generated by the power generator 3.

The current detector 13 is coupled to the main battery 12 and detects the current of the main battery 12. For example, the current detector 13 includes a shunt resistor 13a and detects the current in charging and discharging of the main battery 12. Specifically, the current detector 13 detects the current from a voltage proportional to the current generated at the resistance of the shunt resistor 13a.

The protection circuit unit 14 is a circuit that protects the loads 2. The protection circuit unit 14 is installed between the main battery 12, and the loads 2 that are coupled to the vehicle power supply master 10, and protects the circuit extending over the loads 2 from the main battery 12. The protection circuit unit 14 includes an interruption circuit 14a and a protection circuit 14b. The interruption circuit 14a includes a switch and is coupled to the main battery 12. The interruption circuit 14a has on/off control of the current that flows from the main battery 12 to the loads 2 by turning the switch on and off. For example, the interruption circuit 14a interrupts the current by turning the switch off when over-current flows from the main battery 12 to the loads 2. The protection circuit 14b includes a plurality of fuses 14c and is coupled to the interruption circuit 14a. The protection circuit 14b protects the circuit as each fuse 14c is fused when over-current flows from the main battery 12 to the loads 2.

The power supply controller 15 has control of the current that flows from the main battery 12 to the respective area power supply masters 20 via the trunk line unit 1a or 1b of two systems and the branch line unit 1c. The power supply controller 15 includes a plurality of interruption circuits 15a. Each interruption circuit 15a includes a plurality of switches, and is coupled to the area power supply masters 20 via the respective switches, the trunk line unit 1a or 1b of two systems, and the branch line unit 1c. Each interruption circuit 15a distributes, by turning the switches on and off, the electric power supplied from the main battery 12 to the respective area power supply masters 20 via the trunk line unit 1a or 1b of two systems and the branch line unit 1c.

The controller 16 monitors the state of the main battery 12 and has control of the power supply controller 15. The controller 16 includes a CPU 16a. The CPU 16a is coupled to the shunt resistor 13a and determines a charging rate (amount of charge) of the main battery 12 based on a current value of the main battery 12 detected by the shunt resistor 13a and a voltage value of the main battery 12. Furthermore, the CPU 16a is coupled to each of the interruption circuits 15a of the power supply controller 15, and has control of the interruption circuits 15a. For example, the CPU 16a has on/off control of each switch of the interruption circuits 15a based on the charging rate of the main battery 12. Accordingly, the CPU 16a can control the electric power distributed to the respective area power supply masters 20 from the main battery 12 based on the charging rate of the main battery 12. Furthermore, the CPU 16a is coupled to each of the area power supply masters 20 via the trunk line unit 1a or 1b of two systems and the branch line unit 1c and performs exchanging of signals with the area power supply masters 20.

Next, a configuration example of the area power supply master 20 will be described. The area power supply master 20 is an area power supply controller, and supplies, to the loads 2, at least one of the electric power that is supplied from the vehicle power supply master 10 and the electric power that is charged in the area battery 22, which will be described later. The area power supply master 20 includes an electric power controller 20a, a housing 21, and the area battery 22. The electric power controller 20a has control of the electric power that is supplied from the vehicle power supply master 10 and the electric power that is charged in the area battery 22. The electric power controller 20a includes a current detector 23, a power distribution unit (J/B) 24, a power supply controller 25, a power switching unit 26, a power supply controller 27, and a controller 28. As for the area power supply master 20, the electric power controller 20a and the area battery 22 are accommodated in the housing 21, for example. The area power supply master 20 is installed, for example, in the inside of a front door or a rear door of the vehicle in a state that various electronic components of the electric power controller 20a are accommodated in the housing 21. Accordingly, as for the vehicle power supply control device 1, the area power supply master 20 can be easily installed. In the vehicle power supply control device 1, because the area battery 22 is accommodated in the housing 21, the amount of wires coupling the area battery 22 can be suppressed and the wires can be easily arranged. As for the area power supply master 20, the area battery 22 may be installed outside the housing 21. In the first embodiment, a plurality of area power supply masters 20 are installed, and specifically, three area power supply masters 20 are installed. Although each area power supply master 20 is installed in the corresponding vehicle area sectioned depending on the assembly structure of the vehicle, the embodiment is not limited thereto.

The area battery 22 is a sub-electrical storage device, and charges and discharges the electric power. Examples of the area battery 22 include various storage batteries such as lead batteries, nickel-hydrogen batteries, and lithium-ion batteries. The area battery 22 is arranged for each area power supply master 20.

The current detector 23 is coupled to the area battery 22 and detects the current of the area battery 22. The current detector 23 includes a shunt resistor 23a, for example, and detects the current in charging and discharging of the area battery 22. Specifically, the current detector 23 detects the current from a voltage proportional to the current generated at the resistance of the shunt resistor 23a.

The power distribution unit 24 distributes the electric power supplied from the main battery 12 and the area battery 22 to the loads 2. For example, the power distribution unit 24 includes a plurality of fuses 24a, and is coupled to the loads 2 via the respective fuses 24a. The power distribution unit 24 protects the circuit as each fuse 24a is fused when over-current flows into the loads 2.

The power supply controller 25 supplies the electric power supplied from the main battery 12 and the area battery 22 to the loads 2. The power supply controller 25 includes relay contacts 25a, for example, and is coupled to a plurality of loads 2 different from the respective loads 2 coupled to the power distribution unit 24 via the relay contacts 25a. That is, each area power supply master 20 is coupled to the loads 2 via the power distribution unit 24 or the power supply controller 25. The power supply controller 25 supplies the electric power to the loads 2, as the coil of the relay contact 25a is excited and the relay contact 25a is turned on. The power supply controller 25 stops the supply of the electric power to the loads 2, as the excitation of the coil is released and the relay contact 25a is turned off.

The power switching unit 26 switches the supply of the electric power that is charged in the area battery 22. The power switching unit 26 includes a relay contact 26a, and is coupled to the power distribution unit 24 and the power supply controller 25 via the relay contact 26a. The power switching unit 26 supplies the electric power of the area battery 22 to the respective loads 2 via the power distribution unit 24 and the power supply controller 25, as the coil of the relay contact 26a is excited and the relay contact 26a is turned on. The power switching unit 26 supplies no electric power of the area battery 22 to the respective loads 2 via the power distribution unit 24 and the power supply controller 25, as the excitation of the coil is released and the relay contact 26a is turned off. When the electric power (output voltage) supplied from the main battery 12 and the electric power (output voltage) supplied from the area battery 22 are of different power source characteristics, the power switching unit 26 makes those power source characteristics the same.

The power supply controller 27 supplies or interrupts the electric power supplied from the main battery 12. The power supply controller 27 is coupled to the main battery 12 via the first trunk line unit 1a or the second trunk line unit 1b, and others. The power supply controller 27 includes an interruption circuit 27a, for example, and by turning a switch of the interruption circuit 27a on and off, has control of the electric power supplied to the loads 2 from the main battery 12 via the first trunk line unit 1a or the second trunk line unit 1b, and others. The power supply controller 27 is coupled to the controller 28, and on/off control of the switch in the interruption circuit 27a is performed by the controller 28.

The controller 28 monitors the state of the area battery 22 and has control of the power supply controller 25, the power switching unit 26, and the power supply controller 27. The controller 28 includes a CPU 28a. The CPU 28a is coupled to the shunt resistor 23a and determines a charging rate of the area battery 22 based on the current value of the area battery 22 detected by the shunt resistor 23a and the voltage value of the area battery 22.

Furthermore, the CPU 28a turns on the relay contact 26a by exciting the coil of the relay contact 26a of the power switching unit 26, and turns off the relay contact 26a by releasing the excitation of the coil of the relay contact 26a. For example, the CPU 28a performs on/off control of the relay contact 26a based on the charging rate of the area battery 22. Accordingly, the CPU 28a can control the electric power supplied to the respective loads 2 from the area battery 22 based on the charging rate of the area battery 22. The CPU 28a performs on/off control of the relay contact 25a of the power supply controller 25 and has control of the electric power that is supplied to the respective loads 2 coupled via the power supply controller 25. Furthermore, the CPU 28a performs on/off control of the switch of the interruption circuit 27a of the power supply controller 27. Accordingly, the CPU 28a can supply or interrupt the electric power supplied from the main battery 12. Furthermore, the CPU 28a is coupled to the vehicle power supply master 10 via the trunk line unit 1a or 1b of two systems and the branch line unit 1c and performs exchanging of signals with the vehicle power supply master 10.

First Operation Example: Processing of Charging Area Battery

Figure 3:
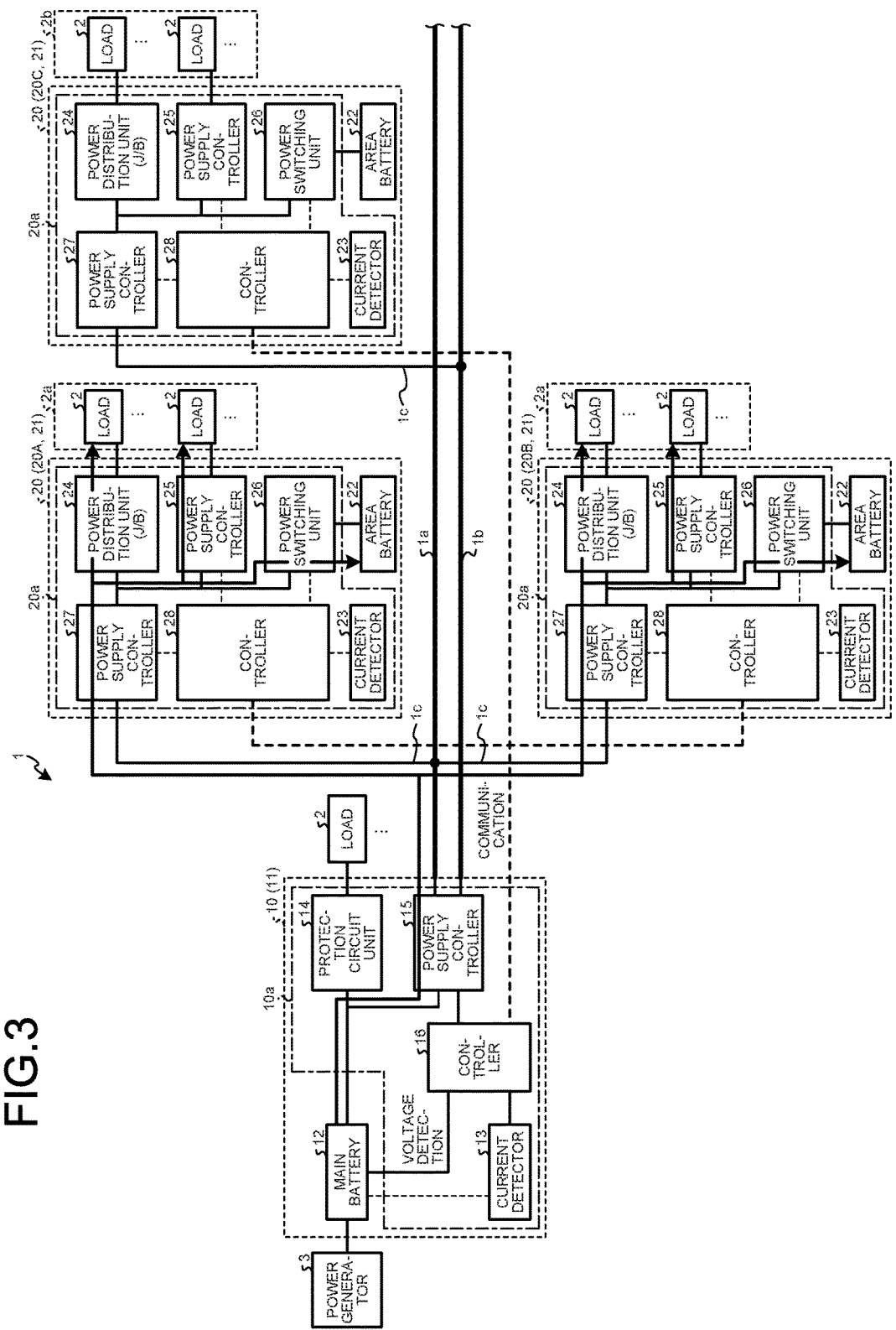
FIG. 3 is a block diagram illustrating a first operation example of the vehicle power supply control device in the first embodiment.
Figure 4:
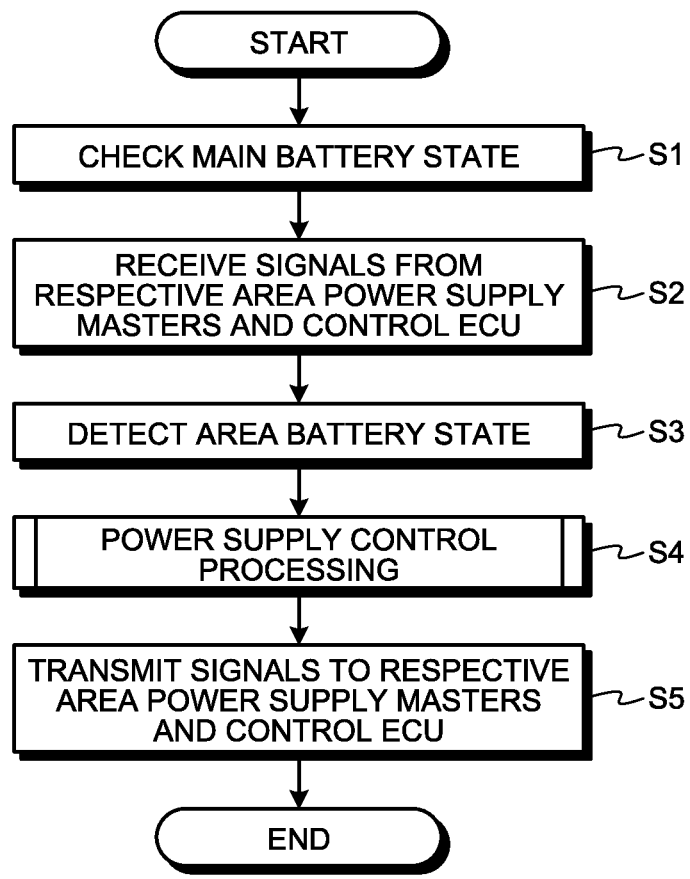
FIG. 4 is a flowchart illustrating the first operation example of the vehicle power supply control device in the first embodiment.

Next, a first operation example of the vehicle power supply control device 1 in the first embodiment will be described. In this example, as illustrated in FIG. 3, described is an example in which the vehicle power supply control device 1 supplies the electric power of the main battery 12 to the respective loads 2 of the area power supply masters 20 (20A, 20B) and charges the area batteries 22 of the area power supply masters 20A and 20B. The vehicle power supply master 10, as illustrated in FIG. 4, checks the state of the main battery 12 (Step S1). For example, the vehicle power supply master 10 checks the voltage value of the main battery 12. Then, the vehicle power supply master 10 receives signals concerning the electric power from the respective area power supply masters 20 and a control ECU (not depicted) via the trunk line units 1a and 1b of two systems and the branch line units 1c (Step S2). The control ECU controls the entire vehicle, and controls a drive system such as an engine and a braking system such as a brake, for example. Subsequently, the vehicle power supply master 10 detects the state of the area battery 22 from the respective area power supply masters 20 (Step S3). For example, the vehicle power supply master 10 detects the charging rate of the area battery 22 from the respective area power supply masters 20. Then, the vehicle power supply master 10 performs power supply control processing (Step S4). For example, the vehicle power supply master 10 charges, based on the power generation capacity of the power generator 3, the area battery 22 by supplying the electric power of the main battery 12 to the area power supply masters 20. The detail of the power supply control processing will be described later. Then, the vehicle power supply master 10 transmits signals to the respective area power supply masters 20 and the control ECU via the trunk line units 1a and 1b of two systems and the branch line units 1c (Step S5), and ends the processing. For example, the vehicle power supply master 10 transmits the information concerning the charging at the above-described Step S4 to the respective area power supply masters 20 and the control ECU via the trunk line units 1a and 1b of two systems and the branch line units 1c.

Figure 5:
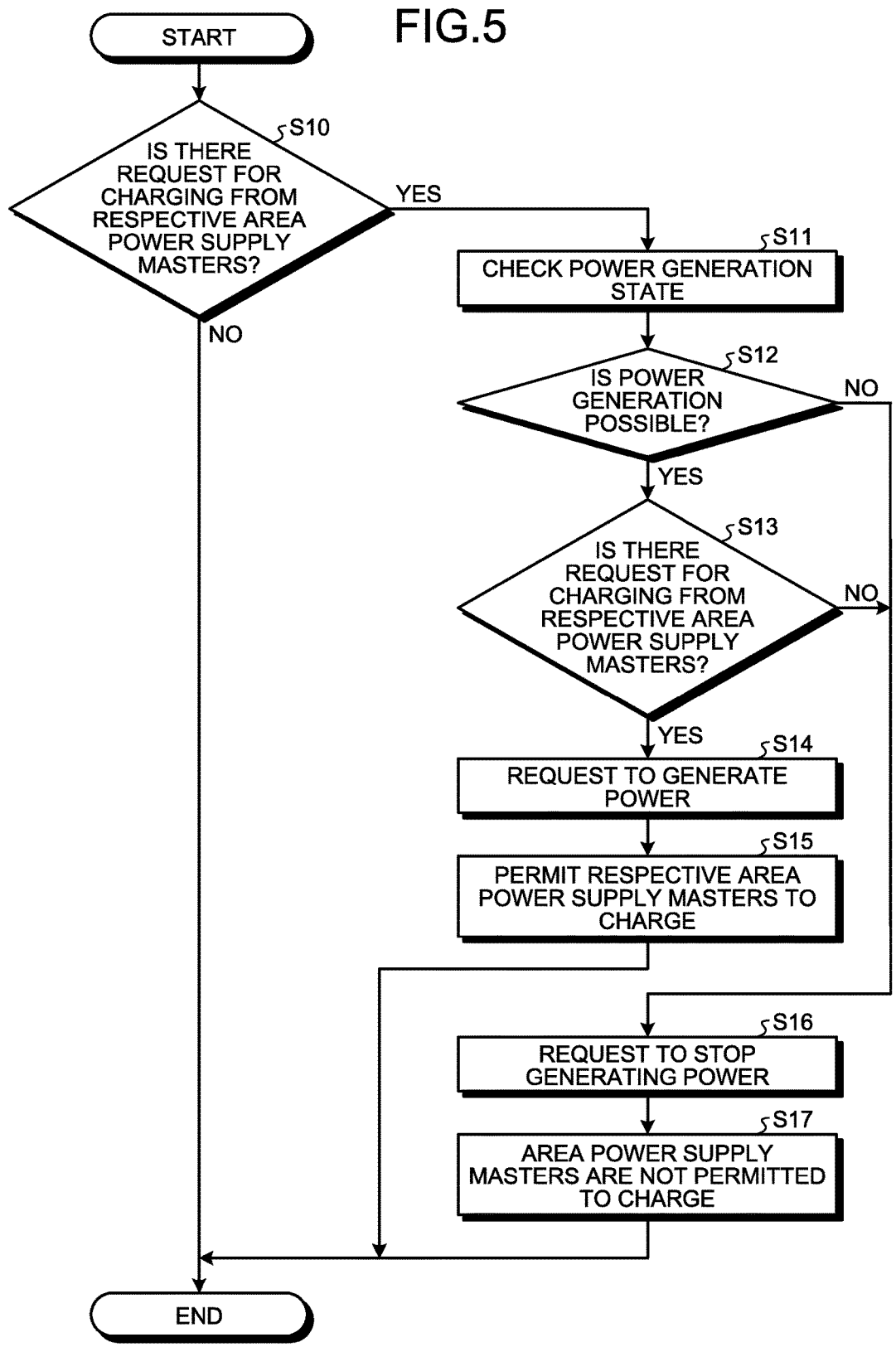
FIG. 5 is a flowchart illustrating the first operation example of the vehicle power supply control device in the first embodiment.

The following describes the power supply control processing of the above-described Step S4 in detail. The vehicle power supply master 10, as illustrated in FIG. 5, checks whether there is a request for charging from each area power supply master 20 (Step S10). When there is a request for charging from the respective area power supply masters 20 (Yes at Step S10), the vehicle power supply master 10 checks a state of power generation by the power generator 3 (Step S11). Then, the vehicle power supply master 10 determines whether the electric power to charge the area battery 22 can be generated by the power generator 3 (Step S12). When the electric power to charge the area battery 22 can be generated by the power generator 3 (Yes at Step S12), the vehicle power supply master 10 determines whether there is a request for charging from each area power supply master 20 (Step S13). When there is a request for charging from the area power supply master 20 (Yes at Step S13), the vehicle power supply master 10 requests the power generator 3 to generate the electric power for charging the area power supply master 20 (Step S14). Subsequently, as illustrated in FIG. 3, the vehicle power supply master 10 permits the area power supply masters 20 to charge, and supplies the electric power, which was generated by the power generator 3 and charged to the main battery 12, to the area power supply masters 20 via the trunk line units 1a and 1b of two systems and the branch line units 1c (Step S15). Then, the vehicle power supply master 10 charges the area battery 22 of the respective area power supply masters 20 and supplies the electric power to the loads 2 via the respective area power supply masters 20, and ends the processing. The vehicle power supply master 10 may only perform charging the area battery 22, without supplying the electric power to the loads 2 via the area power supply masters 20, in charging the area battery 22 of the respective area power supply masters 20.

At the above-described Step S12, when it is not possible to generate the electric power to charge the area battery 22 by the power generator 3 (No at Step S12), the vehicle power supply master 10 requests the power generator 3 to stop the generation of the electric power for charging the area power supply masters 20 (Step S16). Then, the vehicle power supply master 10 ends the processing, without permitting the area power supply masters 20 to charge (Step S17). When there is no request for charging from the respective area power supply masters 20 at Step S10 (No at Step S10), the vehicle power supply master 10 ends the processing, without supplying the electric power generated by the power generator 3 to the respective area power supply masters 20.

As just described, in the vehicle power supply control device 1 in the first embodiment as the first operation example, when there is a request for charging from each area power supply master 20, the vehicle power supply master 10 charges the area battery 22 of the respective area power supply masters 20 via the trunk line units 1a and 1b of two systems and the branch line units 1c.

Figure 6:
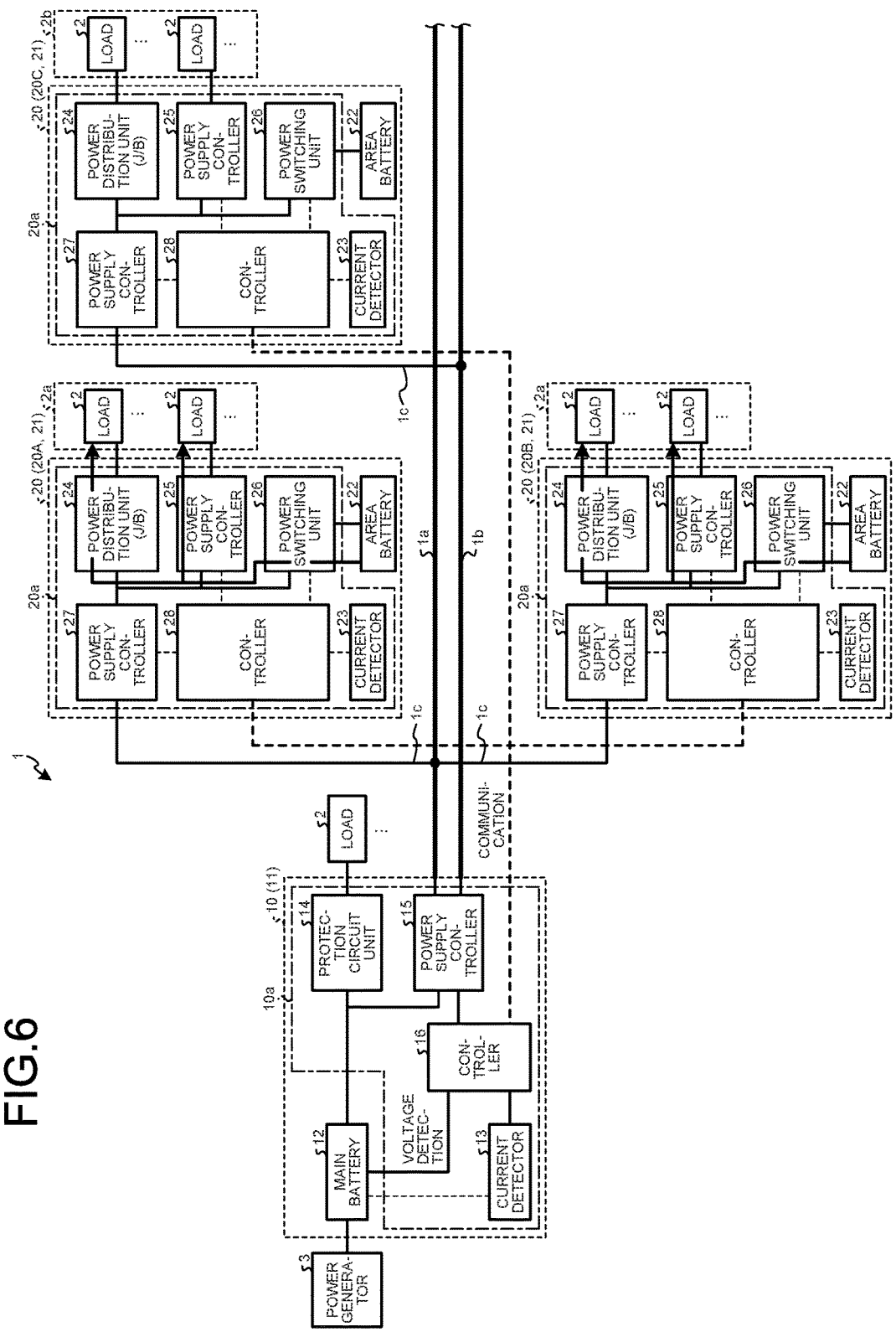
FIG. 6 is a block diagram illustrating a second operation example of the vehicle power supply control device in the first embodiment.
Figure 7:
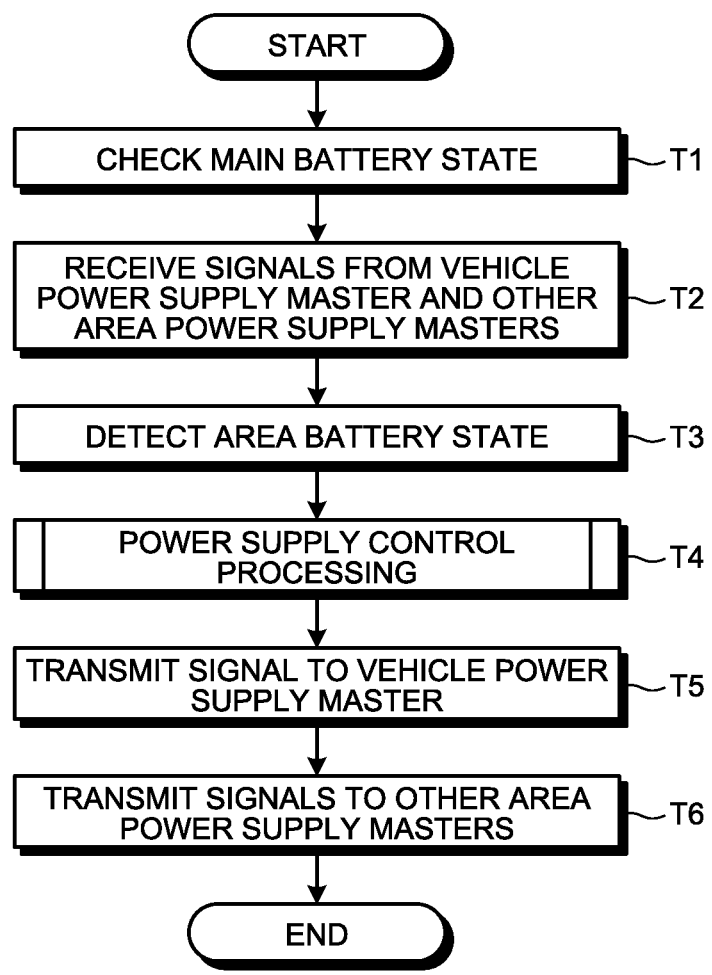
FIG. 7 is a flowchart illustrating the second operation example of the vehicle power supply control device in the first embodiment.

Second Operation Example: Processing when Being Unable to Supply Electric Power from Main Battery Next, a second operation example of the vehicle power supply control device 1 in the first embodiment will be described. In this example, as illustrated in FIG. 6, described is an example in which the vehicle power supply control device 1 is unable to supply the electric power of the main battery 12 to each load 2 of the area power supply masters 20, due to deterioration of the main battery 12, failures in the trunk line units 1a and 1b of two systems and the branch line units 1c, abnormality of the power supply controllers 27, and others. Each area power supply master 20, as illustrated in FIG. 7, checks the state (for example, a voltage value) of the main battery 12 with the vehicle power supply master 10 (Step T1). Then, each area power supply master 20 receives the signals concerning the electric power from the vehicle power supply master 10 and the other area power supply masters 20 via the trunk line unit 1a or 1b of two systems and the branch line units 1c (Step T2). Subsequently, each area power supply master 20 detects the state (for example, a charging rate) of the area battery 22 (Step T3). Then, the area power supply master 20 performs power supply control processing (Step T4). For example, based on the state of the main battery 12 and that of the area battery 22, the area power supply master 20 supplies the electric power of the main battery 12, which is supplied from the vehicle power supply master 10 via the trunk line unit 1a or 1b of two systems and the branch line unit 1c, or the electric power of the area battery 22 to the loads 2. The detail of the power supply control processing will be described later. Subsequently, the area power supply master 20 transmits a signal to the vehicle power supply master 10 via the trunk line unit 1a or 1b of two systems and the branch line unit 1c (Step T5). For example, the area power supply master 20 transmits information concerning the electric power that is supplied at the above-described Step T4 to the vehicle power supply master 10 via the trunk line unit 1a or 1b of two systems and the branch line unit 1c. Specifically, the area power supply master 20 transmits the fact that it supplies the electric power of the main battery 12 to the loads 2 or that it supplies the electric power of the area battery 22 to the loads 2, to the vehicle power supply master 10. Then, each area power supply master 20 transmits the signal to the other area power supply masters 20 via the trunk line units 1a and 1b of two systems and the branch line units 1c (Step T6), and ends the processing. For example, each area power supply master 20 transmits the information concerning the electric power that is supplied at the above-described Step T4 to the other area power supply masters 20 via the trunk line units 1a and 1b of two systems and the branch line units 1c. As just described, as the power supply control processing, each area power supply master 20 supplies, based on the state of the main battery 12 and that of the area battery 22, the electric power of the main battery 12, which is supplied from the vehicle power supply master 10, or the electric power of the area battery 22 to the loads 2.

Figure 8:
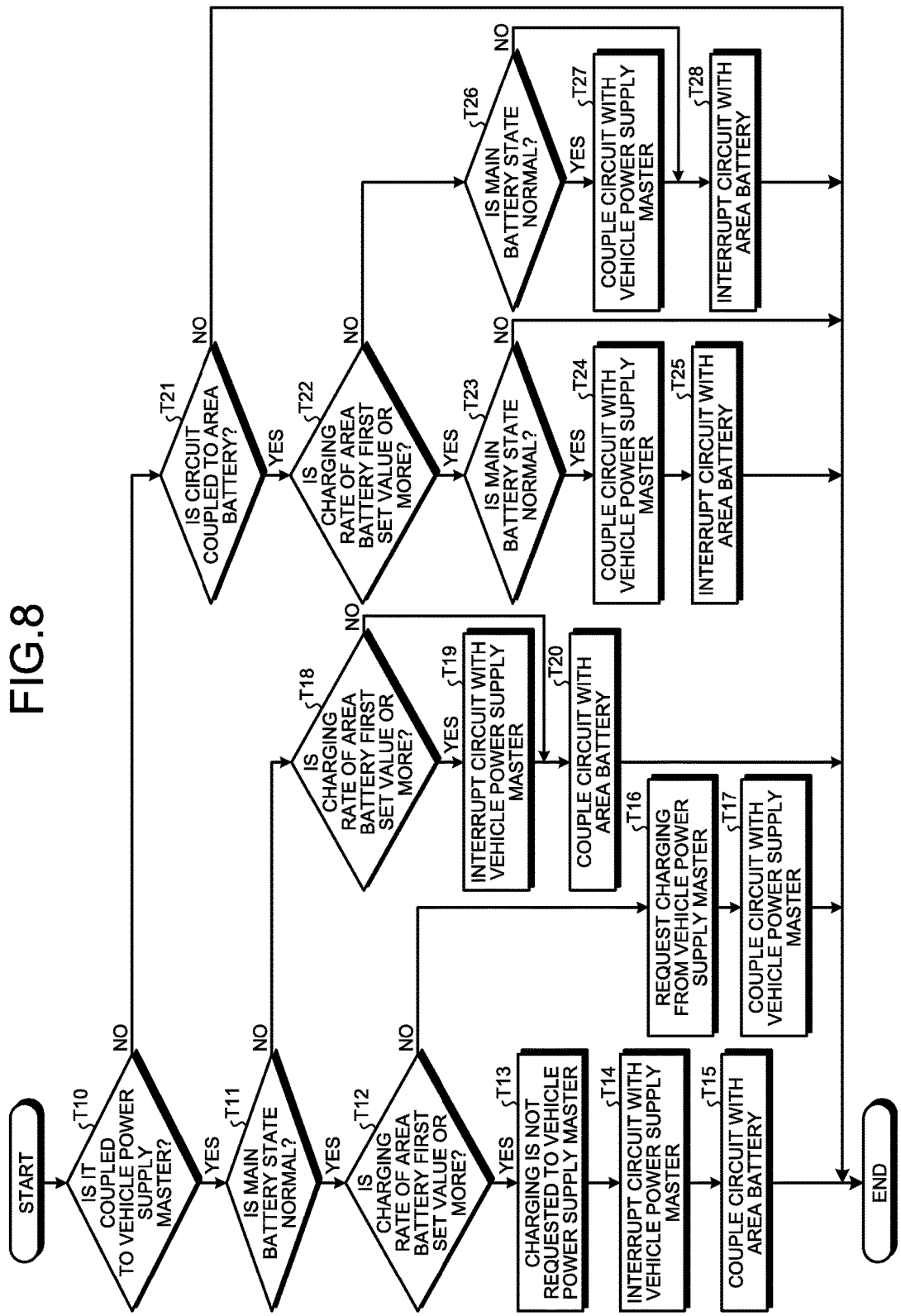
FIG. 8 is a flowchart illustrating the second operation example of the vehicle power supply control device in the first embodiment.

Next, the power supply control processing at the above-described Step T4 will be described in detail. Each area power supply master 20, as illustrated in FIG. 8, checks whether it is coupled to the vehicle power supply master 10 (Step T10). Each area power supply master 20 determines, when it is coupled to the vehicle power supply master 10 (Yes at Step T10), whether the state of the main battery 12 is normal (Step T11). For example, each area power supply master 20 determines it to be normal when the charging rate of the main battery 12 is equal to or greater than a predetermined set value, and determines it to be abnormal when the charging rate of the main battery 12 is below the set value. When the state of the main battery 12 is normal (Yes at Step T11), each area power supply master 20 determines whether the charging rate of the area battery 22 is equal to or greater than a predetermined first set value (Step T12). When the charging rate of the area battery 22 is equal to or greater than the first set value (Yes at Step T12), without requesting the charging from the vehicle power supply master 10 (Step T13), each area power supply master 20 interrupts the circuit with the vehicle power supply master 10 (Step T14). For example, each area power supply master 20 turns off the switch of the interruption circuit 27*a* of the power supply controller 27. Then, the area power supply master 20 couples the circuit with the area battery 22 (Step T15). For example, the area power supply master 20 turns on the relay contact 26*a* of the power switching unit 26. As just described, when the charging rate of each area battery 22 is equal to or greater than the first set value, each area power supply master 20 supplies the electric power of the area battery 22 to the loads 2, and ends the processing.

Meanwhile, when the charging rate of the area battery 22 is below the predetermined first set value (No at Step T12), each area power supply master 20 requests the charging from the vehicle power supply master 10 (Step T16). For example, the area power supply master 20 outputs a signal indicating a charging request to the vehicle power supply master 10 via the trunk line unit 1*a* or 1*b* of two systems and the branch line unit 1*c*. Then, the area power supply master 20 couples the circuit with the vehicle power supply master 10 (Step T17), and ends the processing. For example, each area power supply master 20 turns on the switch of the interruption circuit 27*a* of the power supply controller 27. Accordingly, each area power supply master 20 can charge the electric power supplied from the main battery 12 via the trunk line unit 1*a* or 1*b* of two systems and the branch line unit 1*c* to the area battery 22 and can supply it to the loads 2.

At the above-described Step T11, when the state of the main battery 12 is abnormal (No at Step T11), each area power supply master 20 determines whether the charging rate of each area battery 22 is equal to or greater than the first set value (Step T18). When the charging rate of each area battery 22 is equal to or greater than the first set value (Yes at Step T18), each area power supply master 20 interrupts the circuit with the vehicle power supply master 10 (Step T19). For example, the area power supply master 20 turns off the switch of the interruption circuit 27*a* of the power supply controller 27. Subsequently, each area power supply master 20 couples the circuit with each area battery 22 (Step T20), and ends the processing. For example, the area power supply master 20 turns on the relay contact 26*a* of the power switching unit 26. Accordingly, each area power supply master 20 can supply the electric power of each area battery 22 to the load 2. At the above-described Step T18, when the charging rate of each area battery 22 is below the first set value (No at Step T18), each area power supply master 20 couples the circuit with each area battery 22 without interrupting the circuit with the vehicle power supply master 10 (Step T20).

At the above-described Step T10, each area power supply master 20 determines, when it is not coupled to the vehicle power supply master 10 (No at Step T10), whether the circuit is coupled to the area battery 22 (Step T21). When the circuit is not coupled to the area battery 22 (No at Step T21), the area power supply master 20 ends the processing. When the circuit is coupled to the area battery 22 (Yes at Step T21), each area power supply master 20 determines whether the charging rate of each area battery 22 is equal to or greater than the first set value (Step T22). When the charging rate of each area battery 22 is equal to or greater than the first set value (Yes at Step T22), each area power supply master 20 determines whether the state of the main battery 12 is normal (Step T23). When the state of the main battery 12 is normal (Yes at Step T23), each area power supply master 20 couples the circuit with the vehicle power supply master 10 (Step T24), interrupts the circuit with the area battery 22 (Step T25), and ends the processing. Accordingly, each area power supply master 20 can supply the electric power supplied from the main battery 12 via the trunk line unit 1*a* or 1*b* of two systems and the branch line unit 1*c* to the load 2. When the state of the main battery 12 is abnormal (No at Step T23), each area power supply master 20 continues the coupling with the area battery 22 without coupling the circuit with the vehicle power supply master 10.

At the above-described Step T22, when the charging rate of each area battery 22 is below the first set value (No at Step T22), each area power supply master 20 determines whether the state of the main battery 12 is normal (Step T26). When the state of the main battery 12 is normal (Yes at Step T26), each area power supply master 20 couples the circuit with the vehicle power supply master 10 (Step T27), interrupts the circuit with the area battery 22 (Step T28), and ends the processing. Accordingly, each area power supply master 20 can charge the electric power supplied from the main battery 12 via the trunk line unit 1*a* or 1*b* of two systems and the branch line unit 1*c* to the area battery 22 and can supply it to the loads 2. When the state of the main battery 12 is abnormal (No at Step T26), each area power supply master 20 interrupts the circuit with the area battery 22 (Step T28) without coupling the circuit with the vehicle power supply master 10, and ends the processing.

As just described, the vehicle power supply control device 1 in the first embodiment as the second operation example includes the trunk line units 1*a* and 1*b* of two systems provided in the vehicle; the branch line units 1*c* branching from the trunk line units 1*a* and 1*b* of two systems; the vehicle power supply master 10 that is coupled to the trunk line units 1*a* and 1*b* of two systems and has the main battery 12 that charges and discharges the electric power; and the area power supply masters 20 that are coupled to at least one of the trunk line units 1*a* and 1*b* of two systems, are coupled to the loads 2 that consume electric power, and have the area battery 22 that charges and discharges the electric power. The vehicle power supply master 10 supplies the electric power of the main battery 12 to the area power supply masters 20, via at least one of the trunk line units 1*a* and 1*b* of two systems and the branch line units 1*c*, and the area power supply masters 20 supply, to the loads 2, the electric power supplied from the vehicle power supply master 10 or the electric power charged in the area battery 22. Accordingly, when the electric power is supplied from the vehicle power supply master 10 via the trunk line units 1*a* and 1*b* of two systems and the branch line units 1*c*, the vehicle power supply control device 1 can supply the electric power from the vehicle power supply master 10 to the loads 2. Furthermore, when the electric power is not supplied from the vehicle power supply master 10 via the trunk line unit 1*a* or 1*b* of two systems and the branch line unit 1*c*, the vehicle power supply control device 1 can supply the electric power charged in the area battery 22 to the loads 2. Even when a malfunction occurs on one trunk line unit 1*b* (1*a*) out of the trunk line units 1*a* and 1*b* of two systems, because the electric power can be supplied to the loads 2 coupled to the other trunk line unit 1*a* (1*b*), the vehicle power supply control device 1 can stably supply the electric power to the loads 2 as compared with a vehicle power supply control device having the trunk line unit of one system. The vehicle power supply control device 1 can improve the wiring arrangement by the trunk line units 1*a* and 1*b* of two systems and the respective branch line units 1*c*.

Furthermore, in the vehicle power supply control device 1, the loads 2 constitute the different load groups 2a and 2b, and each of the load groups 2a and 2b is coupled to the trunk line unit 1a or 1b of the different systems out of the trunk line units 1a and 1b of the multiple systems via at least one of the area power supply masters 20. For example, in the vehicle power supply control device 1, the first load group 2a that concerns the traveling of the vehicle and the importance of which is relatively high is coupled to the first trunk line unit 1a out of the trunk line units 1a and 1b of two systems, and the second load group 2b that concerns other than the traveling of the vehicle and the importance of which is relatively low is coupled to the second trunk line unit 1b. Accordingly, because the trunk line units 1a and 1b of two systems can be managed depending on the importance, the vehicle power supply control device 1 can stably supply the electric power to the loads 2 coupled to the first trunk line unit 1a for which the importance is high, as compared with a vehicle power supply control device having the trunk line unit of one system.

Furthermore, in the vehicle power supply control device 1, each area power supply master 20 supplies the electric power of the area battery 22 to the loads 2, when the vehicle power supply master 10 is unable to supply the electric power to the area power supply master 20 via at least one of the trunk line units 1a and 1b of the multiple systems and the branch line units 1c. Accordingly, even when it is not possible to supply the electric power to the area power supply master 20 as the charging rate of the main battery 12 is low, for example, because it is possible to supply the electric power of the area battery 22 to the loads 2, the vehicle power supply control device 1 can stably supply the electric power to the loads 2.

In the vehicle power supply control device 1, the area power supply master 10 supplies the electric power of the area battery 22 to the loads 2 when the charging rate of the area battery 22 is equal to or greater than the predetermined first set value, and supplies no electric power of the area battery 22 to the loads 2 when the charging rate of the area battery 22 is below the first set value. Accordingly, the vehicle power supply control device 1 can supply the electric power of the area battery 22 to the loads 2 depending on the charging rate of the area battery 22.

Second Embodiment

Figure 9:
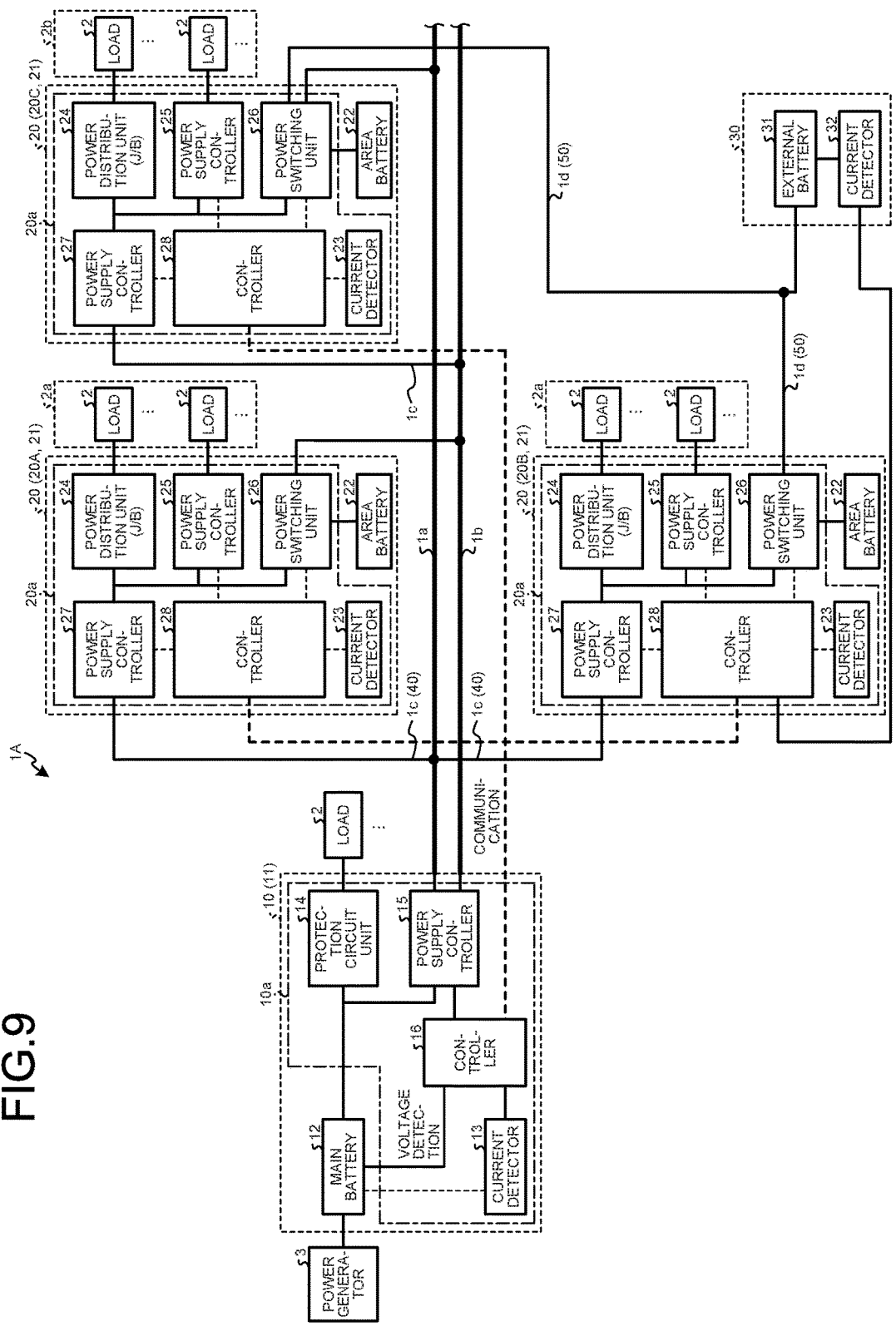
FIG. 9 is a block diagram illustrating a configuration example of a vehicle power supply control device according to a second embodiment.

Next, a vehicle power supply control device 1A according to a second embodiment will be described. The vehicle power supply control device 1A is different from the vehicle power supply control device 1 of the first embodiment in that an external power supply unit 30 illustrated in FIG. 9 is included and in that the power switching units 26 of area power supply masters 20B and 20C are coupled to the trunk line unit 1a or 1b of multiple systems. As for the vehicle power supply control device 1A in the second embodiment, the constituents the same as those of the vehicle power supply control device 1 of the first embodiment will be denoted by the identical reference signs, and the detailed description thereof will be omitted.

The external power supply unit 30 supplies the electric power to the area power supply masters 20. The external power supply unit 30 is provided outside the area power supply masters 20 and is coupled to the area power supply masters 20B and 20C via a coupling line 1d. The path that couples the external power supply unit 30 and the area power supply masters 20B and 20C by the coupling line 1d is a second supply path 50. The external power supply unit 30 includes an external battery 31 and a current detector 32. The external battery 31 is an external electrical storage device, and charges and discharges the electric power. The external battery 31 is a battery different from the main battery 12, and is coupled to the area power supply masters 20B and 20C. Examples of the external battery 31 include various storage batteries such as lead batteries, nickel-hydrogen batteries, and lithium-ion batteries. The external power supply unit 30 supplies the electric power to the area power supply masters 20B and 20C from the external battery 31 via the second supply path 50. The current detector 32 is coupled to the external battery 31 and detects the current of the external battery 31. The current detector 32 includes a shunt resistor, for example, and detects the current in charging and discharging of the external battery 31. Specifically, the current detector 32 detects the current from a voltage proportional to the current generated at the resistance of the shunt resistor. The current detector 32 is coupled to the area power supply master 20B and outputs the detection result to the area power supply master 20B. The area power supply master 20B charges and discharges the external battery 31 based on the detection result output from the current detector 32. For example, the area power supply master 20B performs control so as to discharge the external battery 31 when the charging rate of the external battery 31 is equal to or greater than a predetermined set value, and performs control so as to charge the external battery 31 when the charging rate of the external battery 31 is below the predetermined set value.

The external power supply unit 30 supplies the electric power of the external battery 31 to the area power supply masters 20B and 20C as the relay contacts 26a of the power switching units 26 are turned on by the area power supply masters 20B and 20C. Accordingly, the area power supply masters 20B and 20C can supply the electric power to the respective loads 2 more stably. In the external power supply unit 30, the electric power supplied to the area power supply masters 20B and 20C is stopped as the relay contacts 26a of the power switching units 26 are turned off by the area power supply masters 20B and 20C. The external power supply unit 30 may include a power generator, in place of the external battery 31. In this case, the external power supply unit 30 supplies the electric power generated by the power generator to the area power supply masters 20B and 20C as the relay contacts 26a of the power switching units 26 are turned on by the area power supply masters 20B and 20C.

Moreover, in the vehicle power supply control device 1A, the external power supply unit 30 shares the vehicle power supply master 10. For example, the vehicle power supply control device 1A includes a first supply path 40 that supplies the electric power from the vehicle power supply master 10 to the area power supply master 20 via one of the trunk line units 1a and 1b of the multiple systems and the branch line unit 1c, and the second supply path 50 that is different from the first supply path 40 and supplies the electric power from the vehicle power supply master 10 to the area power supply master 20. For example, the first supply path 40 is a path that supplies the electric power from the vehicle power supply master 10 to the area power supply master 20A via the first trunk line unit 1a and the branch line unit 1c, and the second supply path 50 is a path that supplies the electric power from the vehicle power supply master 10 to the area power supply master 20A via the second trunk line unit 1b and the branch line unit 1c. The area power supply master 20 supplies, to the loads 2, the electric power supplied from the vehicle power supply master 10 via the first supply path 40, or the electric power supplied from the vehicle power supply master 10 via the second supply path 50. Accordingly, the vehicle power supply control device 1A can supply the electric power to the loads 2 more stably.

Modifications

Next, modifications of the first and the second embodiments will be described. In the vehicle power supply control devices 1 and 1A, when the vehicle power supply master 10 can supply the electric power to each area power supply master 20 via at least one of the trunk line units 1a and 1b of multiple systems and the branch line unit 1c, and when the charging rate of the area battery 22 is equal to or greater than the set value, each area power supply master 20 may preferentially supply the electric power of the area battery 22 to the loads 2. For example, in the vehicle power supply control devices 1 and 1A, when the charging rate of the main battery 12 is equal to or greater than the predetermined set value, and when the charging rate of the area battery 22 is equal to or greater than the first set value, each area power supply master 20 may preferentially supply the electric power of the area battery 22 to the respective loads 2. Accordingly, the vehicle power supply control devices 1 and 1A can suppress intensive use of the main battery 12 of the vehicle power supply master 10. Furthermore, the vehicle power supply control devices 1 and 1A can achieve efficient use of the area battery 22.

Furthermore, in the vehicle power supply control devices 1 and 1A, the vehicle power supply master 10 may, depending on a situation, supply the electric power of the area battery 22 of one area power supply master 20 to the loads 2 that are coupled to the other area power supply master 20 via at least one of the trunk line units 1a and 1b of multiple systems and the branch line units 1c. For example, the vehicle power supply master 10 may supply the electric power of the area battery 22 of one area power supply master 20 to the loads 2 of the other area power supply master 20, when it is not possible to supply the electric power of the area battery 22 of the other area power supply master 20 to the loads 2 coupled to the other area power supply master 20. Specifically, when the charging rate of the area battery 22 of one area power supply master 20 is equal to or greater than the first set value, and when the charging rate of the area battery 22 of the other area power supply master 20 is below the first set value, the vehicle power supply master 10 supplies the electric power from the one area power supply master 20 to the loads 2 coupled to the other area power supply master 20. Accordingly, because the electric power can be supplied between the area power supply masters 20, the vehicle power supply control devices 1 and 1A can stably supply the electric power to the loads 2.

Furthermore, when there is a request for charging from one area power supply master 20, the vehicle power supply master 10 may charge the area battery 22 of the one area power supply master 20 with the electric power that is supplied from the main battery 12 of the vehicle power supply master 10, or the electric power that is charged in the area battery 22 of the other area power supply master 20.

The vehicle power supply master 10 may charge the main battery 12 by the electric power that is supplied from the area power supply masters 20. For example, when the charging rate of the main battery 12 is decreased, the vehicle power supply master 10 checks the state (for example, charging rate) of the area battery 22 of the area power supply masters 20. The vehicle power supply master 10 then charges the main battery 12 by the electric power that is supplied from the area power supply master 20 that can supply the electric power.

The vehicle power supply control device in the present embodiments can stably supply the electric power to a plurality of loads on the vehicle, because the master power supply controller supplies the electric power of the main electrical storage device to a plurality of area power supply controllers via trunk line units of multiple systems and because the area power supply controllers supply the electric power that is supplied from the master power supply controller or the electric power that is charged in the sub-electrical storage device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply control device comprising:
   trunk line units of multiple systems provided in a vehicle;
   branch line units branched from the trunk line units of multiple systems;
   a master power supply controller that is coupled to the trunk line units of multiple systems and includes a main electrical storage device that charges and discharges electric power; and
   a plurality of area power supply controllers that are coupled to at least one of the trunk line units of multiple systems via the branch line units, are coupled to a load that consumes electric power, and each of the plurality of area power supply controllers includes a sub-electrical storage device that charges and discharges electric power, wherein
   the master power supply controller supplies electric power of the main electrical storage device to the area power supply controllers via at least one of the trunk line units of multiple systems and the branch line units, and
   the area power supply controllers supply, to the load, electric power that is supplied from the master power supply controller or electric power that is charged in the sub-electrical storage device.

2. The vehicle power supply control device according to claim 1, wherein
   the load includes a plurality of loads,
   the loads constitute a plurality of different load groups, and
   each of the load groups is coupled to the trunk line unit of a different system out of the trunk line units of multiple systems via at least one of the area power supply controllers.

3. The vehicle power supply control device according to claim 2, wherein
   each of the area power supply controllers supplies electric power of the sub-electrical storage device to the load, when the master power supply controller is unable to supply electric power to the relevant area power supply controller via at least one of the trunk line units of multiple systems and the branch line units.

4. The vehicle power supply control device according to claim 2, wherein
   each of the area power supply controllers supplies electric power of the sub-electrical storage device to the load, when a charging rate of the sub-electrical storage device is equal to or greater than a predetermined set value, and supplies no electric power of the sub-electrical storage device to the load, when the charging rate of the sub-electrical storage device is below the set value.

5. The vehicle power supply control device according to claim 2, wherein
each of the area power supply controllers preferentially supplies electric power of the sub-electrical storage device to the load, when the master power supply controller is able to supply electric power to the relevant area power supply controller via at least one of the trunk line units of multiple systems and the branch line units, and when a charging rate of the sub-electrical storage device is equal to or greater than the set value.

6. The vehicle power supply control device according to claim 2, wherein
the master power supply controller supplies, depending on a situation, electric power of the sub-electrical storage device of one of the area power supply controllers to the load that is coupled to another area power supply controller via at least one of the trunk line units of multiple systems and the branch line units.

7. The vehicle power supply control device according to claim 2, further comprising:
an external power supply unit that is provided outside the area power supply controllers and is capable of supplying electric power to the area power supply controllers;
a first supply path that supplies electric power to the area power supply controllers from the master power supply controller via one of the trunk line units of multiple systems and the branch line units; and
a second supply path that is different from the first supply path and supplies electric power to the area power supply controllers from the external power supply unit, wherein
each of the area power supply controllers supplies, to the load, electric power supplied from the master power supply controller via the first supply path or electric power supplied from the external power supply unit via the second supply path.

8. The vehicle power supply control device according to claim 1, wherein
each of the area power supply controllers supplies electric power of the sub-electrical storage device to the load, when the master power supply controller is unable to supply electric power to the relevant area power supply controller via at least one of the trunk line units of multiple systems and the branch line units.

9. The vehicle power supply control device according to claim 8, wherein
each of the area power supply controllers supplies electric power of the sub-electrical storage device to the load, when a charging rate of the sub-electrical storage device is equal to or greater than a predetermined set value, and supplies no electric power of the sub-electrical storage device to the load, when the charging rate of the sub-electrical storage device is below the set value.

10. The vehicle power supply control device according to claim 8, wherein
each of the area power supply controllers preferentially supplies electric power of the sub-electrical storage device to the load, when the master power supply controller is able to supply electric power to the relevant area power supply controller via at least one of the trunk line units of multiple systems and the branch line units, and when a charging rate of the sub-electrical storage device is equal to or greater than the set value.

11. The vehicle power supply control device according to claim 8, wherein
the master power supply controller supplies, depending on a situation, electric power of the sub-electrical storage device of one of the area power supply controllers to the load that is coupled to another area power supply controller via at least one of the trunk line units of multiple systems and the branch line units.

12. The vehicle power supply control device according to claim 8, further comprising:
an external power supply unit that is provided outside the area power supply controllers and is capable of supplying electric power to the area power supply controllers;
a first supply path that supplies electric power to the area power supply controllers from the master power supply controller via one of the trunk line units of multiple systems and the branch line units; and
a second supply path that is different from the first supply path and supplies electric power to the area power supply controllers from the external power supply unit, wherein
each of the area power supply controllers supplies, to the load, electric power supplied from the master power supply controller via the first supply path or electric power supplied from the external power supply unit via the second supply path.

13. The vehicle power supply control device according to claim 1, wherein
each of the area power supply controllers supplies electric power of the sub-electrical storage device to the load, when a charging rate of the sub-electrical storage device is equal to or greater than a predetermined set value, and supplies no electric power of the sub-electrical storage device to the load, when the charging rate of the sub-electrical storage device is below the set value.

14. The vehicle power supply control device according to claim 13, wherein
each of the area power supply controllers preferentially supplies electric power of the sub-electrical storage device to the load, when the master power supply controller is able to supply electric power to the relevant area power supply controller via at least one of the trunk line units of multiple systems and the branch line units, and when a charging rate of the sub-electrical storage device is equal to or greater than the set value.

15. The vehicle power supply control device according to claim 13, wherein
the master power supply controller supplies, depending on a situation, electric power of the sub-electrical storage device of one of the area power supply controllers to the load that is coupled to another area power supply controller via at least one of the trunk line units of multiple systems and the branch line units.

16. The vehicle power supply control device according to claim 13, further comprising:
an external power supply unit that is provided outside the area power supply controllers and is capable of supplying electric power to the area power supply controllers;
a first supply path that supplies electric power to the area power supply controllers from the master power supply controller via one of the trunk line units of multiple systems and the branch line units; and a second supply path that is different from the first supply path and supplies electric power to the area power supply controllers from the external power supply unit, wherein each of the area power supply controllers supplies, to the load, electric power supplied from the master power supply controller via the first supply path or electric power supplied from the external power supply unit via the second supply path.

17. The vehicle power supply control device according to claim 1, wherein each of the area power supply controllers preferentially supplies electric power of the sub-electrical storage device to the load, when the master power supply controller is able to supply electric power to the relevant area power supply controller via at least one of the trunk line units of multiple systems and the branch line units, and when a charging rate of the sub-electrical storage device is equal to or greater than the set value.

18. The vehicle power supply control device according to claim 17, wherein the master power supply controller supplies, depending on a situation, electric power of the sub-electrical storage device of one of the area power supply controllers to the load that is coupled to another area power supply controller via at least one of the trunk line units of multiple systems and the branch line units.

19. The vehicle power supply control device according to claim 1, wherein the master power supply controller supplies, depending on a situation, electric power of the sub-electrical storage device of one of the area power supply controllers to the load that is coupled to another area power supply controller via at least one of the trunk line units of multiple systems and the branch line units.

20. The vehicle power supply control device according to claim 1, further comprising:

an external power supply unit that is provided outside the area power supply controllers and is capable of supplying electric power to the area power supply controllers;

a first supply path that supplies electric power to the area power supply controllers from the master power supply controller via one of the trunk line units of multiple systems and the branch line units; and a second supply path that is different from the first supply path and supplies electric power to the area power supply controllers from the external power supply unit, wherein each of the area power supply controllers supplies, to the load, electric power supplied from the master power supply controller via the first supply path or electric power supplied from the external power supply unit via the second supply path.

* * * * *